Jan. 27, 1953          G. O. KIMMELL          2,626,594
FLUID PRESSURE MECHANISM FOR EFFECTING STEP-BY-STEP
OPERATION OF A MEMBER TO BE OPERATED
Filed June 16, 1947          5 Sheets-Sheet 3
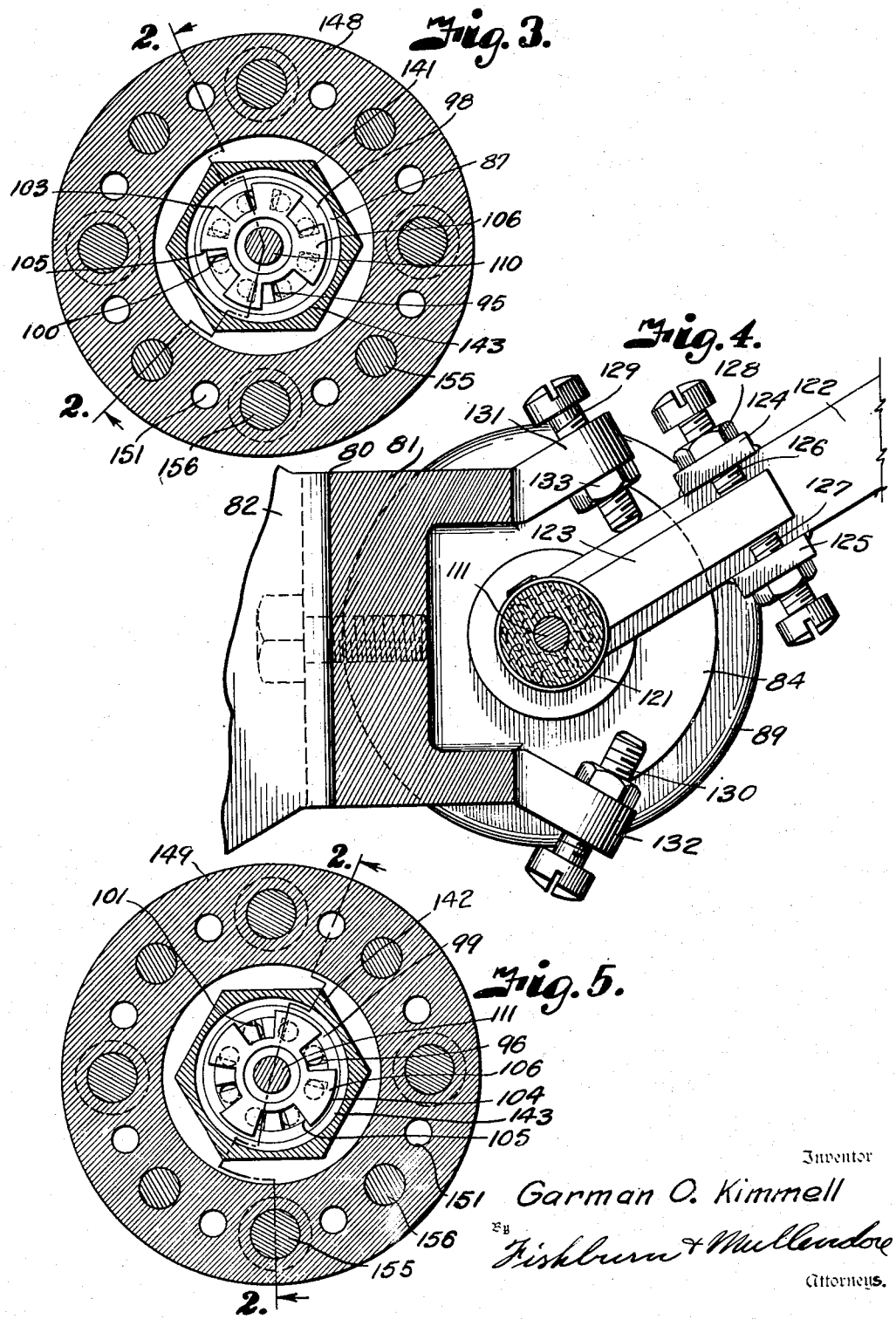
Inventor
Garman O. Kimmell
By Fishburn & Mullendore
Attorneys.

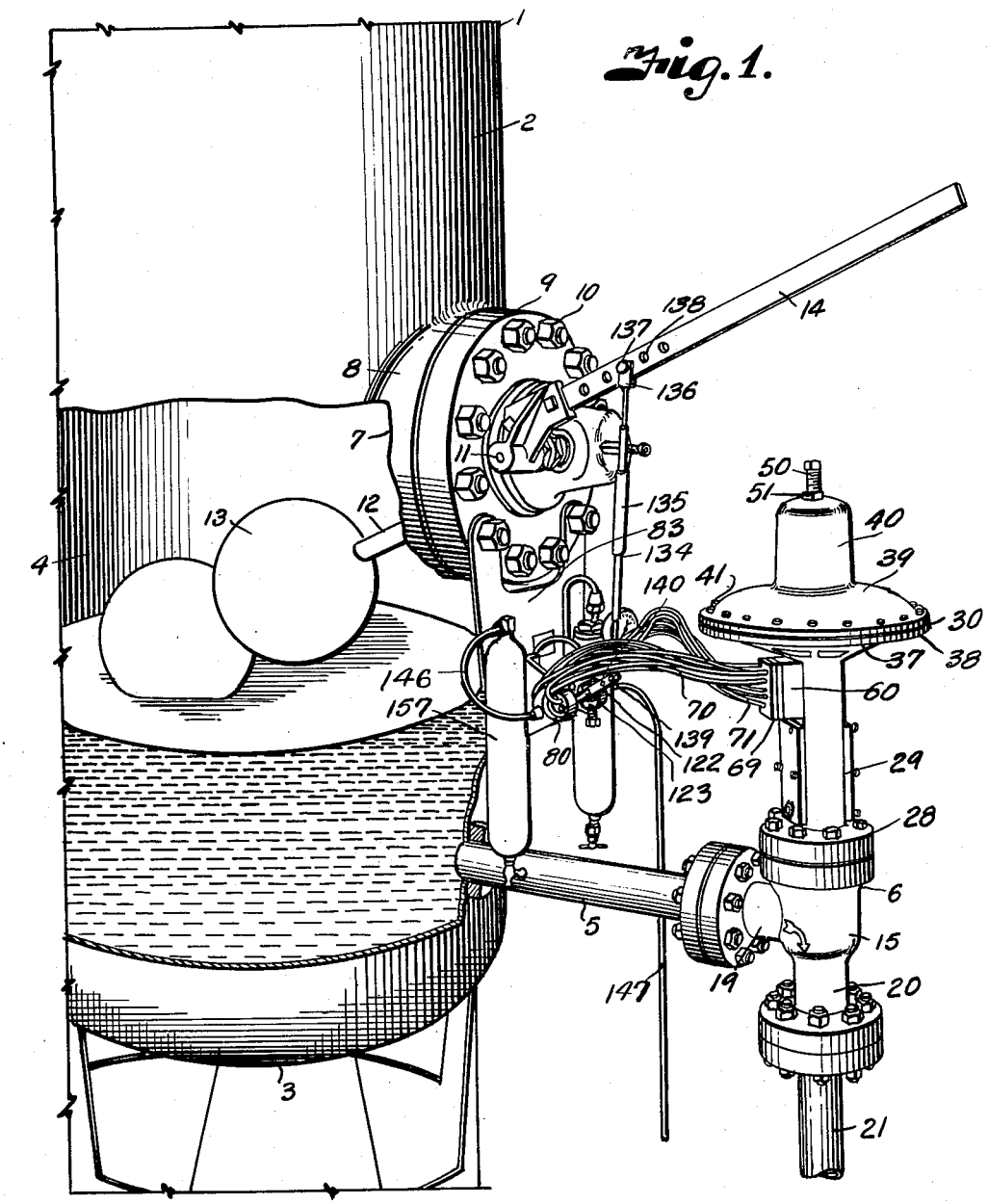

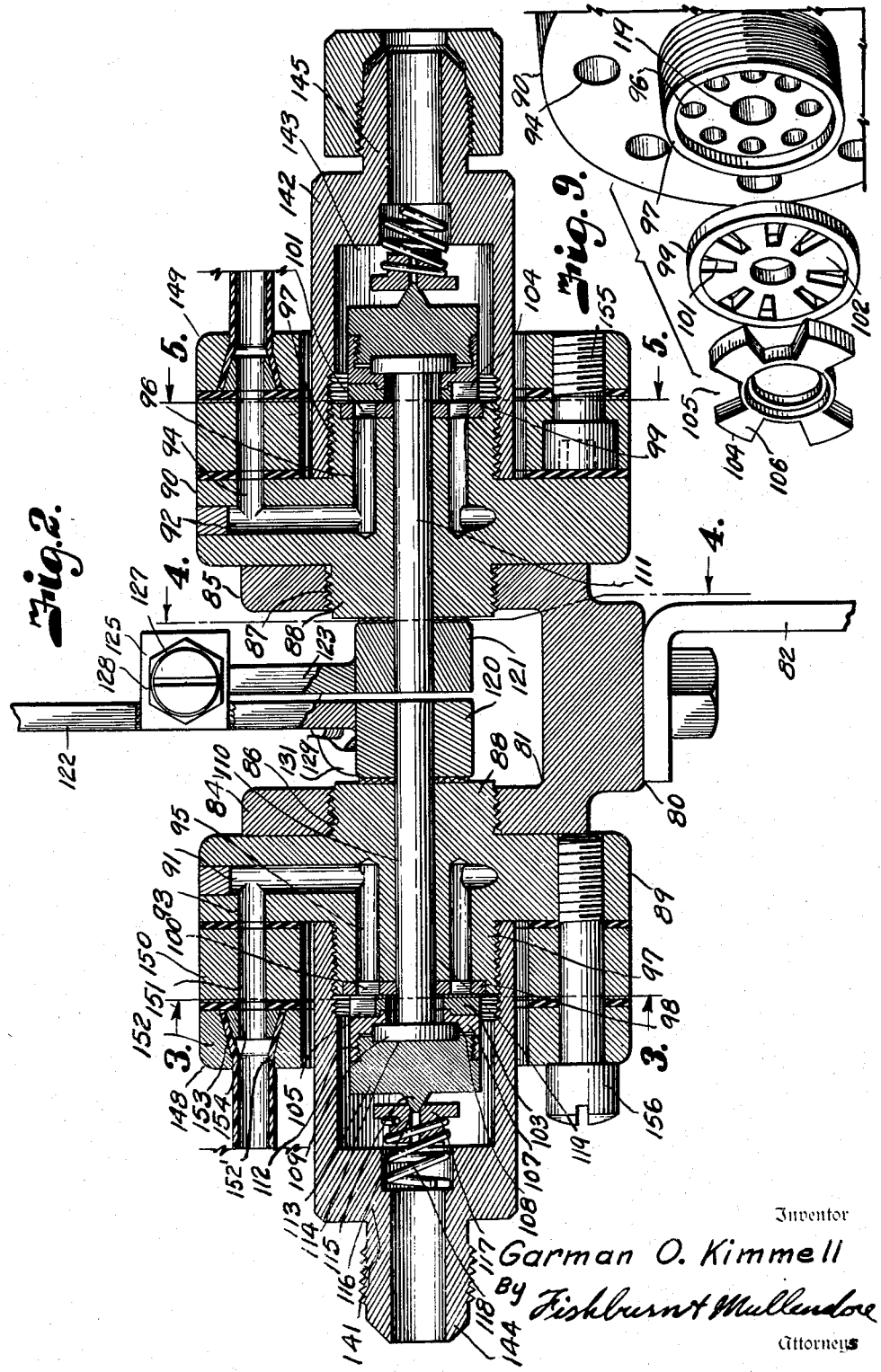

Jan. 27, 1953  G. O. KIMMELL  2,626,594
FLUID PRESSURE MECHANISM FOR EFFECTING STEP-BY-STEP
OPERATION OF A MEMBER TO BE OPERATED
Filed June 16, 1947  5 Sheets-Sheet 4
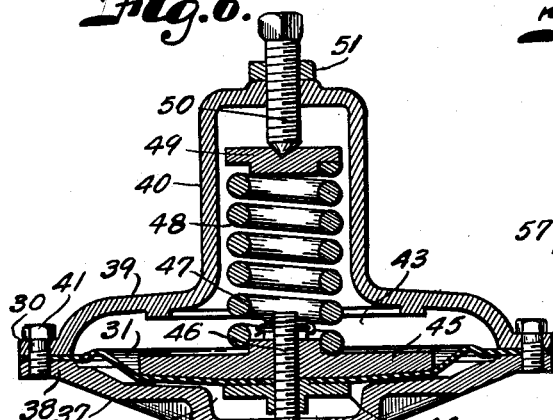
Fig. 6.
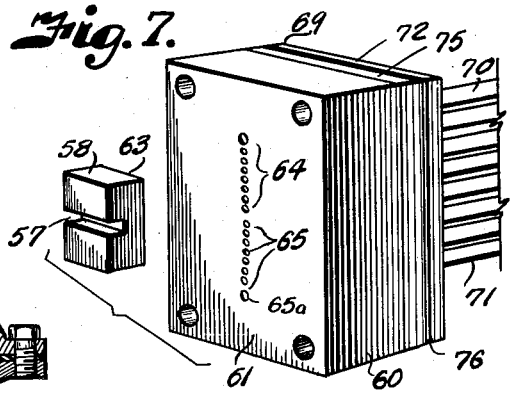
Fig. 7.
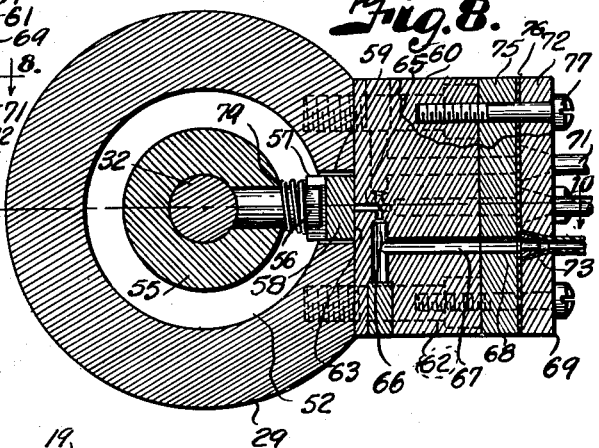
Fig. 8.
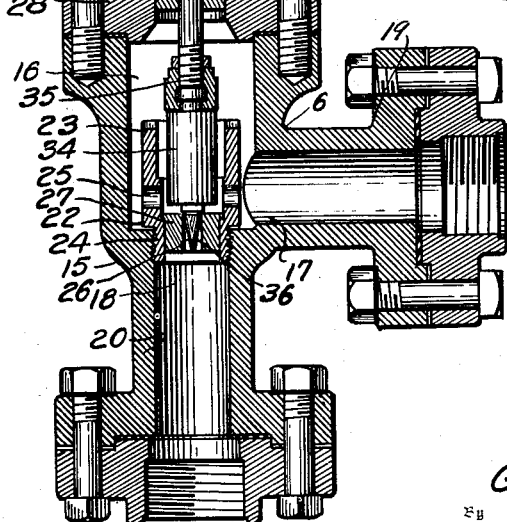
Inventor
Garman O. Kimmell
By Fishburn & Mullendore
Attorneys

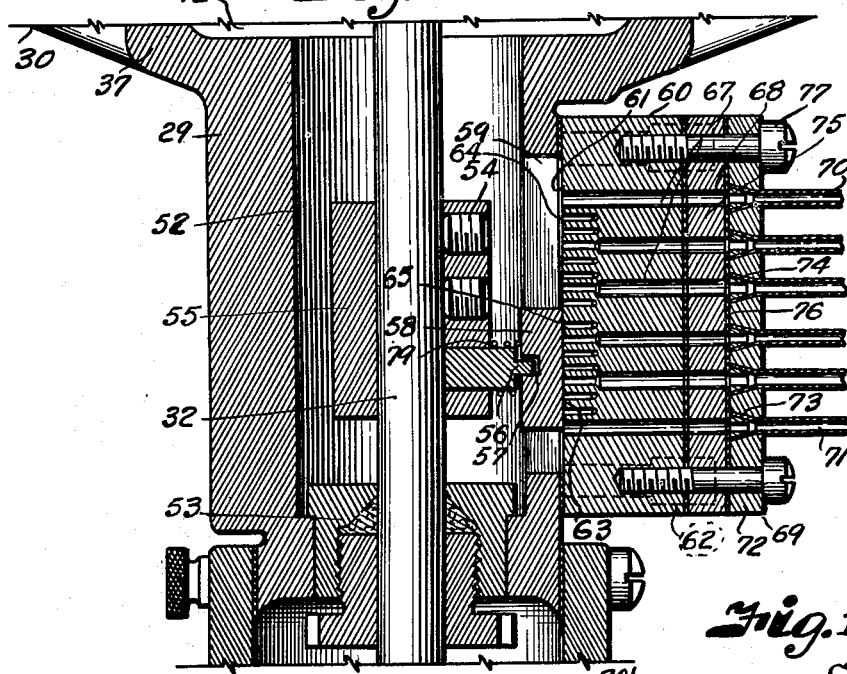
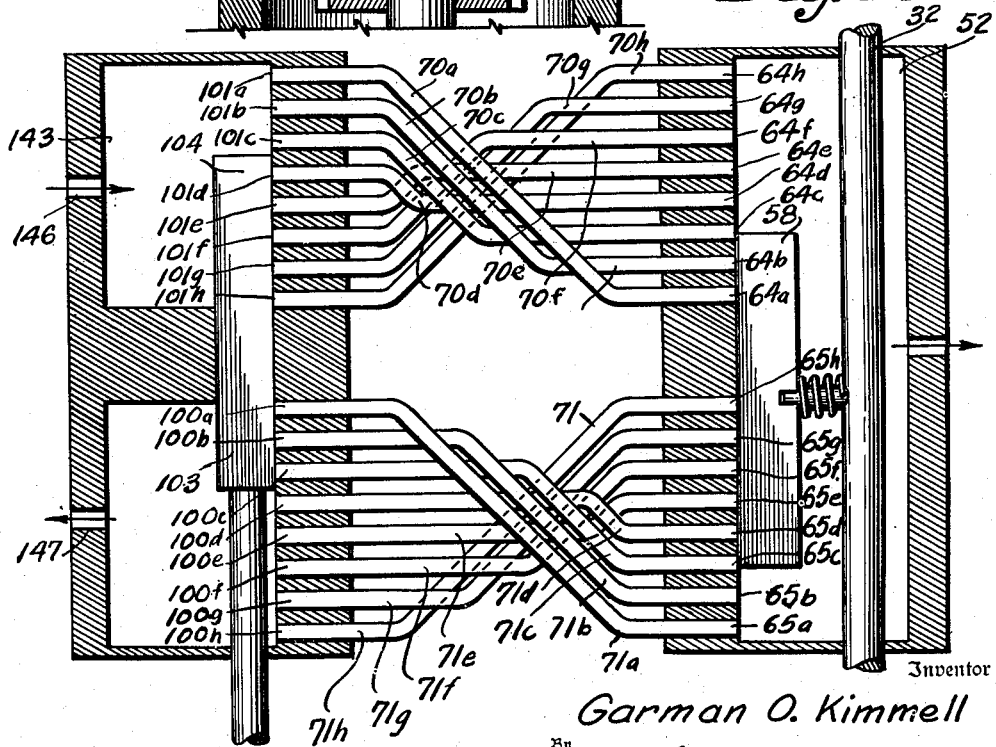

Patented Jan. 27, 1953

2,626,594

UNITED STATES PATENT OFFICE 2,626,594

FLUID PRESSURE MECHANISM FOR EFFECTING STEP-BY-STEP OPERATION OF A MEMBER TO BE OPERATED

Garman O. Kimmell, Oklahoma City, Okla., assignor to Black, Sivalls & Bryson, Inc., Kansas City, Mo., a corporation of Delaware Application June 16, 1947, Serial No. 754,969

3 Claims. (Cl. 121—41)

1

This invention relates to valves and particularly those operated responsive to accumulation of liquids in a vessel, for example, an oil and gas separator. Usually such valves are actuated by a float that rises with the liquid to open the valve and lowers to close the valve upon discharge of the liquid. Direct float operated valves provide good throttling of liquid from the tank at lower pressures but are inadequate in the high pressure range. In the high pressure range, the float is usually connected to a modulated pilot which in turn through fluid medium operates the valve. All modulated valves are subjected to hunting and are not conservative of the fluid medium, some being the constant bleed type. Power fluid requirements particularly in the case of remote high pressure separators present quite a problem in that the power fluid is taken from the gas portion of the separator and has to be reduced in pressure for use in the pilot and valve, the reduction being accompanied by temperature drops, probably freezing, and condensation of liquid.

When gas from the separator is to be metered, steady discharge of liquid from the separator is necessary to prevent ragged and almost unreadable gas meter chart marking. Snap action valves and modulated throttling valves subject to hunting produce ragged gas meter charts.

It is, therefore, the principal object of the present invention to provide a throttling type of valve and an improved operating mechanism therefor that overcomes the difficulties of the present valves so as to maintain more uniform discharge of the liquid resulting in a more accurate and readable gas chart, and requiring a minimum amount of operating fluid.

Another object of the present invention is to provide a throttling type of valve which results in a chart that is readily readable to determine accurately the amount of gas discharged from the separator.

Other objects of the invention are to provide a throttle operating mechanism that is relatively simple, does not incorporate any modulating devices, and does not require numerous and expert adjustments and repair.

A further object of the invention is to provide a throttling valve that operates with small increments or steps so as to provide a substantially balanced uniform flow of liquid from the separator.

In accomplishing these and other objects of the invention, I have provided improved structure, the preferred form of which is illustrated in the accompanying drawings wherein:

2

Fig. 1 is a perspective view of a portion of a separator equipped with a flow throttling valve and operating mechanism embodying the features of the present invention.

Fig. 2 is an enlarged section of the pilot valve for admitting and discharging actuating fluid to the flow throttling valve.

Fig. 3 is a section on the line 3—3 of Fig. 2.

Fig. 4 is a cross section on the line 4—4 of Fig. 2.

Fig. 5 is a cross section on the line 5—5 of Fig. 2.

Fig. 6 is a vertical section through the throttle valve and the actuating mechanism therefor.

Fig. 7 is a perspective view of the valve seat and slide valve for controlling flow of actuating medium to the diaphragm actuator of the throttle valve.

Fig. 8 is an enlarged section on the line 8—8 of Fig. 6.

Fig. 9 is a perspective view of the valve and seat member of the inlet control valve of the pilot valve.

Fig. 10 is an enlarged vertical section on the line 10—10 of Fig. 8.

Fig. 11 is a diagrammatic view of the pilot and control valve for better illustrating the operation thereof.

Referring more in detail to the drawings:

1 designates a separator having an annular wall 2 and a bottom 3 forming a float compartment 4 in which liquid separated in the upper portion of the separator collects for discharge through a pipe 5. Connected in the pipe 5 is a throttle valve 6 for controlling flow of liquid from the separator 1 as later described. Formed in the wall 2 of the separator is an opening 7 encircled by a collar 8 that carries a closure plate 9 which is secured to the collar by fastening devices such as bolts 10. The plate 9 mounts a transverse rock shaft 11 which carries a laterally projecting float stem 12 that extends through the collar and into the separator. A float 13 of any suitable type is fixed on the stem to ride on the surface of the liquid in the compartment 4. The shaft 11 projects from its mounting and carries an arm 14 which in previous arrangements of this character has been directly connected with the actuating stem of the throttle valve or through a snap action mechanism or through a modulated pilot as above pointed out. Such arrangements, however, have not been satisfactory for the reason that they often result in a ragged and oftentimes unreadable recording on the record chart of the gas metering mechanism (not shown), are wasteful of the power fluid often resulting in freezing and regulator trouble, and are delicate and complicated.

As above pointed out, it is the purpose of the present invention to overcome this difficulty by providing an improved operating connection between the lever 14 and the actuating stem of the throttle valve which effects a positive almost constant flow of liquid from the separator and which avoids fluctuations due to hunting of modulated pilot throttle valves.

In carrying out the invention, the throttle valve 6 is of a type to be operated by a fluid pressure motor. The throttle valve illustrated includes a valve body 15 having an internal valve chamber 16 interconnecting inlet and discharge ports 17 and 18 respectively that are located in branches 19 and 20 of the valve body which connect with the pipe 5 and an offtake pipe 21 which leads to a storage tank, a lower stage separator, or to a pipe line (not shown).

Formed in the valve chamber intermediate the ports 17 and 18 is a valve cage or guide 22 which includes a cylindrical head 23 having a neck 24 that is threaded into the inlet end of the outlet port 18. The head 23 is provided with a plurality of openings 25 through which the liquid is adapted to flow into the cage and through an orifice 26 that is provided in a seat member 27, the seat member being readily removable for replacement by a new seat member when necessary.

The upper end of the valve chamber 16 is closed by a head 28 which carries a bonnet 29 supporting a diaphragm casing 30. Mounted in the diaphragm casing is a flexible diaphragm 31 to which is connected a stem 32 that extends coaxially of the neck of the valve bonnet and through a suitable packing box 33 into the valve chamber 16 where it connects with a valve plug 34 through a swivel connection 35. The valve plug 34 is reciprocably guided in the valve cage and has a cone-shaped valving element 36 adapted to reciprocate within the orifice 26 for regulating the flow and to engage the upper face of the removable valve seat.

The diaphragm casing includes a fixed dish-shaped section 37 having a rim 38 for seating the marginal edge of the diaphragm 31, and seated on the margin of the diaphragm is a cover section 39 carrying a spring housing 40. The sections are secured together by fastening devices 41 to provide a leaktight joint. The sections 37 and 39 are shaped to cooperate with the diaphragm in providing a pressure chamber 42 on the stem side of the diaphragm and atmospheric pressure chamber 43 on the other side.

The diaphragm is backed on the respective sides thereof by plates 44 and 45 to reinforce attachment of the valve stem 32 which has a threaded end 46 that extends through registering openings in the plates and diaphragm. The lower plate has threaded connection with the stem and the diaphragm is clamped between the plates by a nut 47 that is turned on the stem and bears upon the upper plate. Seated on the upper plate and contained within the spring housing is a coil spring 48 that carries a cap plate 49 which is engaged by an adjusting screw 50 to regulate action of the spring on the diaphragm, the adjusting screw being threadedly mounted in the top of the spring housing and locked by a jamb nut 51. Formed in the bonnet of the valve immediately adjacent the diaphragm chamber is a valve chest 52 open at its upper end into the pressure chamber 42. The valve chest 52 is closed at its lower end by a packing element 53 which encircles the stem 32 to prevent loss of actuating fluid around the actuating stem of the valve. Fixed to the stem of the valve in the valve chest by set screws 54 is a collar 55 having a tongue 56 extending laterally therefrom and engaging in a transverse groove 57 in a slide valve 58. The valve 58 is guidedly supported for vertical movement within a slot 59 provided in the side of the valve chest 52 and closed by a block 60. The block 60 has a flat face 61 that is secured against a correspondingly flattened face of the valve bonnet by fastening devices such as screws 62. The slide valve also has a flat face 63 which seats against a portion of the face 61 of the block that is exposed through the guide slot 59 and is adapted to cover one or the other group of aligned ports 64 and 65 formed within the block 58 and having outlets arranged in a linear series extending parallel with travel of the slide valve 58 as best shown in Fig. 7. Each port in the respective groups of ports is connected through lateral channels 66 with supply ports 67 extending through the block and registering with openings 68 in a manifold 69 to connect with pressure medium supply tubes 70 in the case of the group of ports 64 and with exhaust tubes 71 in the case of the ports in the group 65. The manifold 69 includes a plate 72 having tapered openings 73 in which the ends of the tubes are anchored by wedge nipples 74 that expand the ends of the tubes when the plate 72 is clamped to a plate 75 also forming a part of the manifold, a suitable gasket 76 being inserted between the plates to maintain the desired seal. The plates of the manifold are clamped together and to the block 60 by fastening devices 77.

In order to retain the slide valve in contact with the face 61 of the block 60, a coil spring 79 is sleeved over the tongue 56 to bear between the collar 55 and slide valve 58 as shown in Fig. 8.

The pilot or actuating valve is best illustrated in Figs. 2 to 5 inclusive and comprises a bracket 80 having a yoke-shaped head 81 supported by an arm 82 that projects from a plate 83 that is secured to the closure plate 9 by certain of the fastening devices 10 as illustrated in Fig. 1. The head 81 has spaced ears 84 and 85 provided with axially aligned openings 86 and 87. Threaded into the openings 86 and 87 are externally threaded bosses 88 on valve port members 89 and 90. The port members 89 and 90 are of circular disk-like formation and have sufficient thickness to accommodate a circular series of radially arranged ports 91 for the member 89 and 92 for the member 90. The radial ports interconnect an outer circular series of ports 93 for the member 89 and 94 for the member 90 with an inner circular series of channels 95 for the member 89 and 96 for the member 90; the inner circular series being located within bosses 97 that project from the respective members 89 and 90 in the opposite directions from the bosses 88.

Inset within the face portion of the bosses 97 of the respective members 89 and 90 are valve seat members 98 and 99 having a circular series of ports 100 and 101 respectively registering with the channels 95 and 96, the ports being of substantially sector shape as best shown in Fig. 9 and arranged so that the overall spacing between outermost side edges of two adjacent ports is slightly less than the spacing 102 between the next adjacent pair of ports. Cooperating with the respective seat members 98 and 99 are valving members 103 and 104 having sector-shaped notches 105 increasing in width in a circumferential direction and through which the ports 100 and 101 respectively are adapted to be exposed upon turning of the valving members as later described. The solid portions 106 of the valving plates between the notches are of a width so that in one position all of the sector-shaped ports in one seat member are adapted to be closed and part of the sector-shaped ports in the other member opened. The valving members 103 and 104 are attached to the clamping rings 107 having internal annular shoulders 108 to seat disk-shaped heads 109 on the ends of rock shafts 110 and 111 for the respective valves. The rings 107 have internally threaded counterbores 112 in which are threaded clamping members 113 having recessed faces 114 adapted to cooperate with the annular shoulders 108 in clamping the heads 109 of the rock shafts 110 and 111 therebetween. The clamping members 113 have cone-shaped axial bosses 115 engaged in cone-shaped axial sockets 116 in bearing members 117 that are resiliently supported by coil springs 118 to retain the valving members in contact with their respective valve seat members. The shafts 110 and 111 are rotatably journalled in axial openings 119 of the port members 89 and 90 and have ends projecting into the space between the ears 84 and 85 to mount the hubs 120 and 121 of lever arms 122 and 123. The lever arm 123 is substantially shorter than the lever arm 122 and is adjustably connected to move therewith as now to be described. The main lever arm 122 has ears 124 and 125 projecting laterally therefrom on the respective sides thereof and the ears are threaded for set screws 126 and 127 that are adapted to be turned into contact with the respective sides of the lever arm 123, the set screws being retained in adjusted position by jamb nuts 128 as best shown in Fig. 4.

Movement of the main lever is limited by adjusting screws 129 and 130 that are threaded in lugs 131 and 132 that project from the yoke 81 intermediate the ears 84 and 85, the set screws being retained in adjusted position by jamb nuts 133 threaded on the shanks of the set screws and adapted to bear against the inner faces of the ears. It is thus obvious that by adjusting the set screws the movement of the arm 122 may be limited to control the rotation of the valve members relative to the seat members.

The arm 122 is operably connected with the float actuated arm 14 by an adjustable connecting link 134 including a turnbuckle 135 and having one end provided with a yoke 136 which is adjustably connected with the arm 14 by a fastening device 137 that is projected through openings in the yoke and through any one of a series of openings 138 in the arm 14. The opposite end of the link is provided with a lateral terminal 139 that is projected through one of a series of openings 140 in the end of the arm 122. Threaded into the bosses 97 are valve housings 141 and 142 having recesses 143 for providing valve chambers to enclose the respective valving members. The housings 141 and 142 have reduced externally threaded necks 144 and 145 that are connected by flexible tubes for connection with pressure medium supply and exhaust tubes 146 and 147. The pressure medium may be supplied from gas discharged from the separator, or pressure from any outside pressure supply.

Encircling the valve housings 141 and 142 are tube connecting manifold rings 148 and 149, each comprising a ring 150 having ports 151 registering with the ports 93 and 94. The tube connecting members also include a ring 152 having holes 152' registering with the ports 151 and provided on inner faces with conical counterbores 153 for anchoring the ends of the tubes 70 and 71 previously mentioned. The ends of the tubes are wedged within the counterbores by conical bushings 154 that are pressed into gripping contact with the walls of the tube when the rings 150 and 152 are secured together by fastening devices such as fillister cap screws 155 as shown in Fig. 2, which screws are applied before attachment of the manifold rings to the port members by cap screws 156.

In assembling the pilot valve the valving member 104 is adjusted on the rock shaft 111 so that all of the ports in the valve seat member 99 are closed and the valving member 103 is adjusted on the rock shaft 110 so that part of the ports in the valve seating member 98 are open. Valving members 103 and 104 are designed so that it is possible for the solid portions 106 of the valving plates to cover all of the ports in the valve seating members 98 and 99 in one relative position of the valving plate and valve seating member. From a position in which all of the ports in the valve seating member are covered by the valving plate, rotation in one direction opens ports one at a time and may or may not reclose part of the first ports opened depending on the number and arrangement of the slots. Ports in the valve seating member may or may not all be open at any one time in the cycle but counter-rotation from one relative starting point will close one port at a time, those being covered at the start of the cycle opening in time to operate in the cycle and then closing in order. With the throttle valve closed the slide valve 58 closes the lower group of ports 65 except part of port 65a and leaves all of the upper group of ports 64 open. With the pilot valve in the float down position, valving member 104 closes all of the ports 101 and the valving member 103 leaves ports 100 open.

The final relative adjustment between the valving members of the pilot may be effected by manipulating the set screws 126 and 127 to vary the relative positions of the lever arms 122 and 123. The set screws 126 and 127 are also adjusted to give the proper movement of the lever arm 122 so that the pilot valving member 103 may be moved from position closing all of the ports in its seat member 98 to a position opening all of the ports and the valving member 104 may be moved from a position where it opens all of the ports in its valve seating member 99 to a position where it closes all of the ports. Final adjustment for the relative movement of the lever arms may be made by operating the turnbuckle 135 in the connecting link 134.

Assuming that the pilot and throttling valves are connected with an oil and gas separator as illustrated and described, the operation is as follows:

With the float 13 in its lowermost position the lever arm 14 extends upwardly as shown in Fig. 1 and the throttling valve is completely closed. In this position pressure chamber 52 is open to atmosphere through the port 65a, tubing 71a and port 100a. The throttle valve is held closed by compression of spring 48. As the oil flows into the bottom of the separator the liquid level will rise and bring the float 13 up with it. Movement of the float rocks the lever arm 14 downwardly to move the pilot lever 122 through the link connection 134 rocking the shafts 110 and 111 to begin closing the ports 100 and opening the ports 101.

As soon as the port 101a is opened and the port 100a closed (see diagram Fig. 11), operating gas which has been admitted into the valve chamber 143 from the regulated pressure bottle 157 through the duct 146, begins to flow through the port 101a through the tube 70a, through the port 64a into the valve chest 52 of the throttle valve 6 to exert pressure on the diaphragm 31 and effect initial opening of the throttle valve. Movement of the valve stem 32 causes the slide valve 58 to close the port 64a and shut off all operating gas to the diaphragm. As the slide valve 58 moves up the exhaust port 65a is opened but operating gas cannot be exhausted through the tube 71a since the port 100a of the pilot valve is closed by the valving member 103. In this way the operating gas pressure is held under the diaphragm 31 and the throttle valve remains open for step one. As long as the liquid level in the separator remains constant, it is obvious that the throttle valve will remain open for step one to permit flow of liquid from the separator through the pipe 5, inlet port 17, valve orifice 26 and outlet port 18 to the pipe line connection 21. If the effective area of the valve opening of step one is not large enough to handle all of the oil being produced, the liquid level will rise in the separator again rocking the pilot valve lever to advance the valving members another step to cover port 100b, uncover port 101b and admit more operating fluid through the port into the slide valve chamber through the tube 70b and port 64b to act upon the diaphragm 31 and open the throttle valve to step two. When the throttle valve is open to step two the slide valve is moved to open the port 65b and close the port 64b to shut off the operating gas to the valve chest and hold pressure under the diaphragm and keep the throttle valve open at step 2. Both ports 65a and 65b are now open but the pressure cannot be discharged through the tubing 71a and 71b because the valve member 103 has moved to also close port 100b to prevent exhaust of the pressure fluid.

As long as the liquid flow into the separator remains constant the liquid flow from the separator also remains constant, however, should the flow tend to increase the rise in level will effect step by step opening of the throttle valve by operating the valving members of the pilot valve through the succeeding positions.

When the opening of the throttle valve is large enough to handle all of the liquid being produced in the separator the throttle valve will remain in that position. It may happen that the valve opening required to handle the liquid flow from the separator will fall between two steps in which case the throttle valve will work between these two steps in accordance with the position of the liquid level in the separator. At any rate, the action will settle down to a step or two adjacent steps and maintain the separator liquid level within a small variation so long as the oil flow is fairly steady and the throttle valve is equipped with a valving member 36 and seat orifice member 27 of the proper size. Additional valving and seat members of various sizes may be made readily available and easily interchanged to maintain the desired balance of flow through action of the pilot valve.

Assuming that the oil level tends to drop in the separator, the float 13 will drop and effect rocking of the pilot valving members 103 and 104 in the opposite direction. For example, assuming that the throttle valve has been operating at the third step and the level in the separator begins to drop, the pilot valving members will be moved responsive to dropping of the float to close the port 101c and open the port 100c. Pressure is then exhausted from the slide valve chest of the throttle valve through the port 65c, tubing 71c and discharged through the open port 100c into the valve chamber from where it is exhausted to atmosphere through the duct 147. Upon drop of pressure on the underside of the diaphragm 31, the spring 48 becomes effective to move the throttling valve 6 one step toward closed position. When the throttle valve has moved to the second step, the slide valve has moved downwardly to close the port 65c trapping the remaining pressure fluid in the slide valve chest to support the diaphragm in the second step position. If the liquid level continues to fall the valving members of the pilot valve are moved to the next step position closing the port 101b and opening the port 100b to allow further exhaust of pressure from the valve chest through the tubing 71b. When the valve has moved one step the ports 65b and 101b are closed, thereby holding the pressure in the valve chest sufficiently to keep the throttle valve open to the first step position. Thus, if the separator liquid level continues to fall, the throttling valve will continue to close step by step until the flow through the throttling valve corresponds to the oil flow through the separator or until the flow from the separator has been completely shut off upon closing of the throttle valve.

By maintaining substantially constant flow of liquid from the separator, gas pressures are kept substantially constant and the marking on the gas meter chart is capable of being read with accuracy.

It is obvious that I have provided a throttling apparatus that is relatively simple and accurately controlled to give the desired uniform flow from the separator, and which requires a very minimum of pressure fluid, and will operate for long periods without expert adjustment and repairs.

What I claim and desire to secure by Letters Patent is:

1. In a fluid pressure mechanism for effecting step by step operation of a member to be operated, a fluid pressure actuatable means, a housing containing the fluid pressure actuatable means and having a linear series of pressure medium inlets and pressure medium outlets, control means having a circular series of ports respectively connected with said inlets, a valving element for said circular series of ports, a shaft rotatably supported by said control means for successively uncovering said ports for admitting a pressure medium through the ports, control means coaxial with the first named control means and having a circular series of exhaust ports connected with said outlet ports, a valving element for the last named control means, a shaft coaxial with the first named shaft for carrying the second named valving element for closing the exhaust ports, actuating levers on the respective shafts, a valve slidable over the series of pressure medium inlets of said housing, and means connecting said slidable valve with the fluid pressure actuatable means for successively closing said inlets and successively opening said outlets as the inlet ports are opened and the outlet ports are closed by said valving elements.

2. In a fluid pressure mechanism for effecting step by step operation of a member to be operated, a fluid pressure actuatable means, a housing containing the fluid pressure actuatable means and having a linear series of pressure medium inlets and pressure medium outlets, control means having a circular series of ports respectively connected with said inlets, a valving element for said circular series of ports, a shaft rotatably supported by said control means for successively uncovering said ports for admitting a pressure medium through the ports, control means coaxial with the first named control means and having a circular series of exhaust ports connected with said outlet ports, a valving element for the last named control means, a shaft coaxial with the first named shaft for carrying the second named valving element for closing the exhaust ports, actuating levers on the respective shafts, means for adjustably interconnecting said levers to position the valving elements relatively to each other, a valve slidable over the linear series of pressure medium inlets of the housing, and means connecting the slidable valve with the pressure actuatable means for successively closing said inlets and successively opening said outlets as the inlet ports are opened and the outlet ports are closed by said valving elements.

3. In a fluid pressure mechanism for effecting step by step operation of a member to be operated, a fluid pressure actuatable means having a linear series of pressure medium inlets and pressure medium outlets, control means having a circular series of ports respectively connected with said inlets, a valving element for said circular series of ports, a shaft rotatably supported by said control means for successively uncovering said ports for admitting a pressure medium through the ports, control means coaxial with the first named control means and having a circular series of exhaust ports connected with said outlet ports, a valving element for the last named control means, a shaft coaxial with the first named shaft for carrying the second named valving element for closing the exhaust ports, means for adjustably mounting the valving elements on said shafts, actuating levers on the respective shafts, and a valve connected with the pressure actuatable means and slidable over said series of linear ports for successively closing said inlets and successively opening said outlets as the inlet ports are opened and the outlet ports are closed by said valving elements.

GARMAN O. KIMMELL.

REFERENCES CITED

The following references are of record in the file of this patent:

UNITED STATES PATENTS

| Number | Name | Date |
|---|---|---|
| 425,036 | Lang | Apr. 8, 1890 |
| 987,048 | Connet | Mar. 14, 1911 |
| 1,154,591 | Dodge | Sept. 21, 1915 |
| 1,354,311 | Landrum | Sept. 28, 1920 |
| 1,428,375 | Humphreys | Sept. 5, 1922 |
| 1,533,745 | Lorraine | Apr. 14, 1925 |
| 2,105,198 | McNamara | Jan. 11, 1938 |

FOREIGN PATENTS

| Number | Country | Date |
|---|---|---|
| 662,771 | Germany | of 1938 |